UNITED STATES PATENT OFFICE.

JOSEPH VILLET-COLLIGNON AND LOUIS GEORGE, OF PARIS, FRANCE.

IMPROVEMENT IN TYPOGRAPHY.

Specification forming part of Letters Patent No. 28,702, dated June 12, 1860.

*To all whom it may concern:*

Be it known that we, JOSEPH VILLET-COLLIGNON, literary man, and LOUIS GEORGE, typographer, of Paris, in the Empire of France, have invented a new and useful Improvement in Typography; and we do hereby declare that the following is a full, clear, and exact description of the same.

Our invention consists in combined types of two or more letters composed each of two or more types of single letters united by solder or cement, the object of such combinations being to economize the time of the compositor by enabling him to take together from the case and set up such letters as oftenest occur together in the construction of words. It is impossible to set any exact limits upon the extent to which such a system of combinations shall be carried, but we will name a few of the most important ones—viz., ff, ffi, fi, ffl, if, ion, tion, ent, ment, an, and, th, the—a few of which are now commonly used formed of two or more letters cast together in one type.

The advantages resulting from the use of combined types composed each of two or more single types as compared with the use of combined types consisting each of two or more letters united by casting them together consists in the provision that is made for the repair of the types in case of one of the letters being injured, and in the fact that if one letter is injured it may be taken away and the remaining letter or letters are useful, but when the types are cast together any injury to one letter renders the whole type useless except as old metal.

We do not confine ourselves to the use of any particular kind of solder or cement to unite the single types of which the combined types are composed; but we have successfully used a solder or metallic cement composed as follows: quicksilver, seventy-five parts, by weight; bismuth, ten parts, by weight; tin, ten parts, by weight; regulus of antimony, five parts, by weight. This solder or cement is fluid, in which state it is used. The method of using it is as follows: when the types to be united are new it is sufficient to simply apply it all over their sides, place them together in a composing-stick provided with a screw, and screw them up together, taking care that their faces range evenly. The solder or cement combines with the metal of the types and soon becomes hard, uniting the types perfectly.

When the types are old they must be first well cleaned and their sides then rubbed with pure mercury applied on the face of a cork, after which the solder or cement is applied and the types placed in the composing-stick and screwed up, as before described.

We do not claim broadly the invention of combined types of two or more letters; but

What we claim as our invention, and desire to secure by Letters Patent, is—

The combined types herein described, composed each of two or more single types united by suitable solder or cement.

J. VILLET-COLLIGNON.
L. GEORGE.

Witnesses:
A. GUION, Jr.,
GEO. HUTTON.